(12) United States Patent
Saheki et al.

(10) Patent No.: US 6,568,259 B2
(45) Date of Patent: May 27, 2003

(54) TRANSMITTER FOR TIRE CONDITION MONITORING APPARATUS

(75) Inventors: Setsuhiro Saheki, Ogaki (JP); Kazunori Sawafuji, Ogaki (JP)

(73) Assignee: Pacific Industrial Co., Ltd. (JP)

( * ) Notice: Subject to any disclaimer, the term of this patent is extended or adjusted under 35 U.S.C. 154(b) by 0 days.

(21) Appl. No.: 09/841,269

(22) Filed: Apr. 24, 2001

(65) Prior Publication Data

US 2002/0124637 A1 Sep. 12, 2002

(30) Foreign Application Priority Data

Mar. 12, 2001 (JP) ........................ 2001-067899

(51) Int. Cl.[7] ................. G01M 17/02; B60C 23/02
(52) U.S. Cl. ............... 73/146; 73/146.2; 73/146.3; 73/146.8
(58) Field of Search ................ 73/146, 146.2, 73/146.3, 146.4, 146.5, 146.8

(56) References Cited

U.S. PATENT DOCUMENTS 6,055,855 A    5/2000  Straub ................ 73/146.8
6,101,870 A  * 8/2000  Kato et al. ........... 73/146.8
6,163,255 A   12/2000  Banzhof et al. ........ 340/447

FOREIGN PATENT DOCUMENTS

| DE | 19610376 | 9/1997 |
| DE | 19613936 | 10/1997 |
| EP | 751017 | 1/1997 |
| EP | 816136 | 1/1998 |
| JP | 2000-025430 | 1/2000 |

* cited by examiner

Primary Examiner—Hezron Williams
Assistant Examiner—Jermaine Jenkins
(74) Attorney, Agent, or Firm—Madson & Metcalf

(57) ABSTRACT

A transmitter includes a main body and a valve stem. The main body has a resin casing, which includes a cylinder. A metal cylindrical collar is inserted in the cylinder. An inserting section of the valve stem is inserted in the collar, and a nut is fastened to a threaded portion of the inserting section. Accordingly, the cylinder and the collar are clamped between a step of the valve stem and the nut. The fastening force of the nut is applied mainly to the collar, thus barely affecting the cylinder. As a result, the valve stem is reliably attached to the main body in a stable manner.

19 Claims, 2 Drawing Sheets

TRANSMITTER FOR TIRE CONDITION MONITORING APPARATUS

BACKGROUND OF THE INVENTION

The present invention relates to transmitters for tire condition monitoring apparatuses, and, more particularly, to structures for attaching valve stems to main bodies of transmitters.

Generally, a wireless type tire condition monitoring apparatus is employed for monitoring tire conditions of a vehicle. More specifically, a transmitter is installed in each wheel, to which a tire is attached, and monitors the condition of the tire. The transmitter measures the pressure in the tire, the temperature in the tire, and the like. The transmitter wirelessly transmits data that indicate the measurements. A receiver is installed in a body frame of the vehicle for receiving the data from the transmitter.

FIG. 4 shows a prior art transmitter by way of example. The transmitter is attached to a wheel rim 110. The transmitter includes a main body 100 and a valve stem 101. The main body 100 is accommodated in a tire (not shown). The valve stem 101 projects from the main body 100 to the exterior of the tire through the wheel rim 110. The main body 100 includes a casing 102 for accommodating a pressure sensor, a signal-processing unit, and a battery (none is shown). The casing 102 has an attachment wall 103 to which the valve stem 101 is attached. The attachment wall 103 is formed integrally with the casing 102. A bolt hole 103a extends through the attachment wall 103.

An air inlet hole 104 axially extends through the valve stem 101. The air inlet hole 104 includes a threaded hole 104a. The threaded hole 104a is located at a position corresponding to the base of the valve stem 101. A bolt 105 is passed through the bolt hole 103a and is engaged with the threaded hole 104a. When the bolt 105 is fastened, the valve stem 101 is secured to the main body 100. The bolt 105 has a through hole 105a through which air flows.

A through hole 110a extends through the wheel rim 110, and the valve stem 101 is passed through the through hole 110a. A rubber grommet 106 is attached to the base of the valve stem 101 to seal the through hole 110a. The valve stem 101 is passed through the through hole 110a from the inner side of the wheel rim 110, thus projecting from the outer side of the wheel rim 110. A nut 107 is engaged with the projecting end of the valve stem 101 through a washer 108. The nut 107 is fastened to secure the valve stem 101 to the wheel rim 110. A cap 109 is engaged with the distal end of the valve stem 101.

The casing 102 accommodates a transmitter antenna for wirelessly transmitting data. The casing 102 is formed of resin such that radio wave, which is wirelessly transmitted, is not shielded by the casing 102. This structure also reduces the weight of the transmitter. However, when the bolt 105 is fastened to secure the valve stem 101 to the main body 100, a relatively great force acts on the attachment wall 103, which is also formed of resin. This may damage the casing 102.

When the vehicle is traveling, centrifugal force acts on the transmitter attached to the wheel rim 110, thus vibrating the transmitter. This may loosen the bolt 105. However, as described, if the bolt 105 is fastened with excessive force, the casing 102 may be damaged. Accordingly, the fastening force of the bolt 105 must be limited.

The fastening force of the bolt 105, which acts on the attachment wall 103, gradually distorts the casing 102 (hereinafter, the distortion of the casing 102 will be referred to as "creeping"). The creeping of the casing 102 also loosens the bolt 105.

BRIEF SUMMARY OF THE INVENTION

Accordingly, it is an objective of the present invention to provide a transmitter of a tire condition monitoring apparatus in which a valve stem is reliably attached to a main body in a stable manner.

To achieve the foregoing and other objectives and in accordance with the purpose of the present invention, the invention provides a transmitter used in a tire condition monitoring apparatus for wirelessly transmitting data indicating a condition of a tire attached to a wheel of a vehicle. The transmitter includes a main body, a cylindrical collar, a valve stem, and a fastener. The main body is located in the tire and has an attachment portion through which an attachment hole extends. The cylindrical collar is received in the attachment hole, and the strength of the collar is larger than the strength of the main body. The valve stem projects from the main body to pass through the wheel. The fastener is fastened to the valve stem to attach the valve stem to the attachment portion of the main body. When the nut is fastened, the attachment portion and the collar are clamped between the valve stem and the fastener. The fastening force of the fastener is applied mainly to the collar.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFEERED EMBODIMENTS

Figure 1:
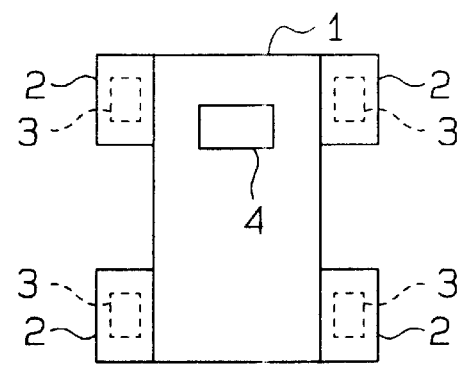
FIG. 1 is a view schematically showing a tire condition monitoring apparatus of an embodiment according to the present invention.

An embodiment of the present invention will now be described with reference to FIGS. 1 to 3. As shown in FIG. 1, a tire condition monitoring apparatus includes four transmitters 3 and a receiver 4. A vehicle 1 has four tires 2. Each transmitter 3 is attached to the associated tire 2 of the vehicle 1. The receiver 4 is installed in the body frame of the vehicle 1. The transmitter 3 monitors the condition of the associated tire 2. More specifically, the transmitter 3 measures the pressure and temperature in the tire 2. The transmitter 3 wirelessly transmits data that indicate the measurements, or the condition of the tire 2, to the receiver 4. In accordance with the received data, the receiver 4 displays information about the pressure and temperature in the tire 2 on a display device (not shown), which is located in the passenger compartment.

Figure 2:
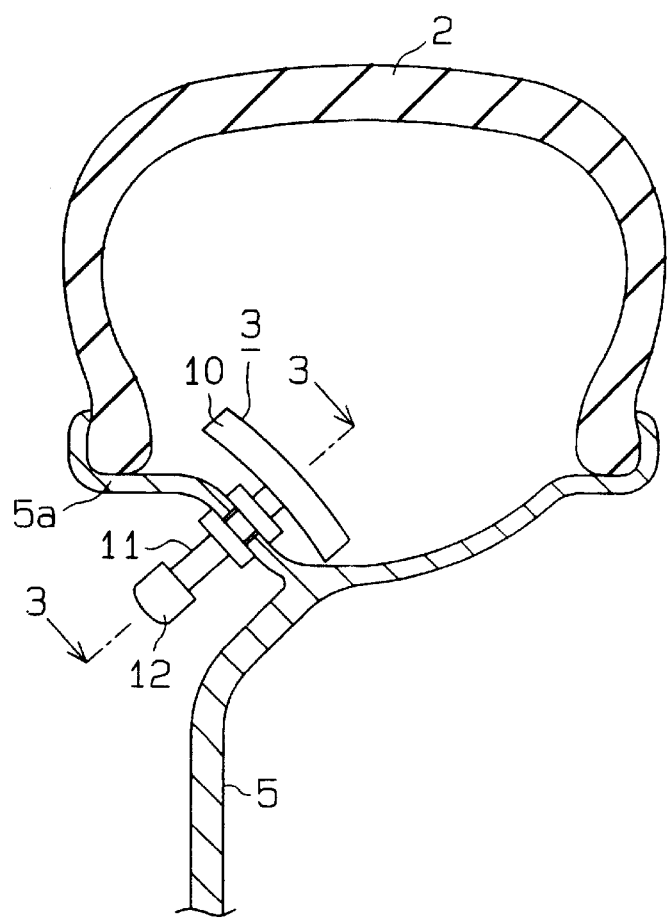
FIG. 2 is a cross-sectional view showing a tire to which a transmitter of the tire condition monitoring apparatus of FIG. 1 is attached.

As shown in FIG. 2, each tire 2 is attached to a wheel 5. Each transmitter 3 includes a main body 10 and a valve stem 11. The main body 10 is located in the associated tire 2, and the valve stem 11 projects from the main body 10 to the exterior of the tire 2 through a rim 5a of the associated wheel 5. The valve stem 11 is formed of conductive material. More specifically, it is preferred that the valve stem 11 is formed of metal. Air is supplied to the interior of each tire 2 through the associated valve stem 11. A cap 12 is detachably attached to the distal end of each valve stem 11. The cap 12 is formed of resin or metal.

Figure 3:
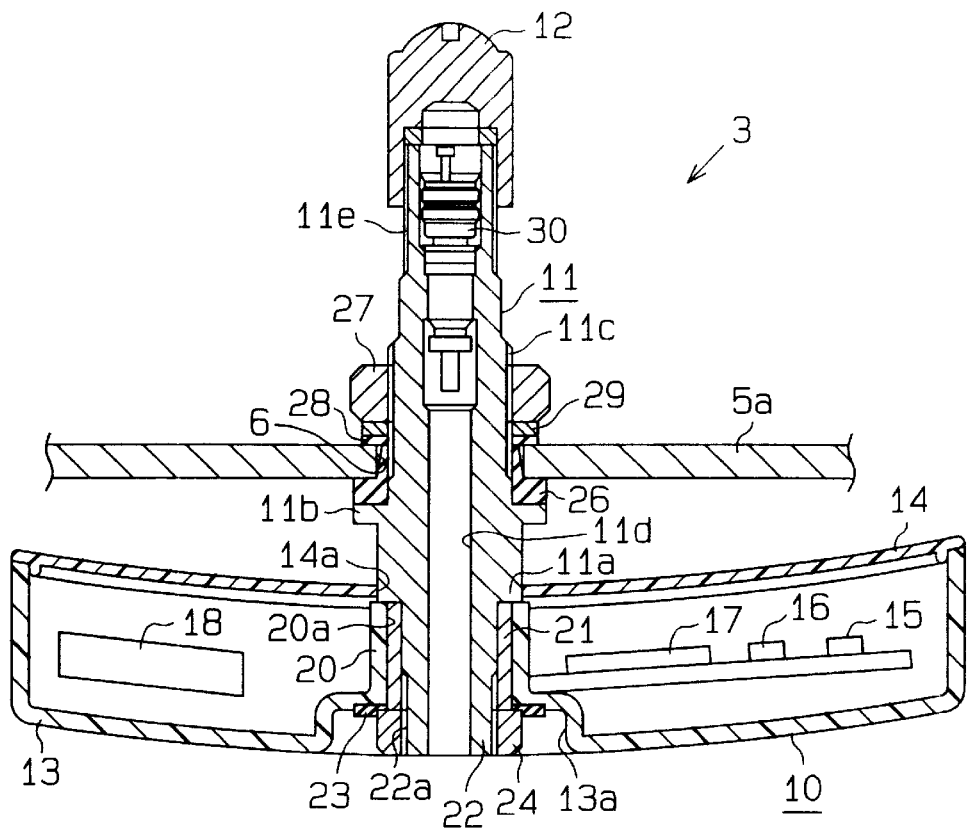
FIG. 3 is an enlarged cross-sectional view taken along line 3—3 of FIG. 2.

As shown in FIG. 3, the main body 10 of each transmitter 3 has a transparent casing 13. The casing 13 has an opening that is closed by a lid 14. The casing 13 accommodates a pressure sensor 15, a temperature sensor 16, a signal processing unit 17, and a battery 18. The casing 13 has a recess 13a, which is located in the substantial middle of the casing 13. A cylinder 20 extends from the bottom of the recess 13a toward the lid 14. The cylinder 20 is formed integrally with the casing 13. The cylinder 20 functions as an attachment portion at which the associated valve stem 11 is attached. The cylinder 20 has a through hole 20a that functions as an attachment hole through which the valve stem 11 is passed. The lid 14 has a through hole 14a that is formed coaxial with the through hole 20a of the cylinder 20. The valve stem 11 extends through the through hole 14a of the lid 14.

A metal cylindrical collar 21 is fitted in the through hole 20a of the cylinder 20. The cylindrical collar 21 is formed of, for example, brass, iron, or aluminum alloy. The collar 21 moves axially along the cylinder 20. The outer diameter of the cylindrical collar 21 is substantially equal to the outer diameter of the through hole 20a. The axial dimension of the cylindrical collar 21 is slightly larger than the axial dimension of the through hole 20a, which is the axial dimension of the cylinder 20.

An annular shock absorber 23 is located at a basal end of the cylinder 20. The shock absorber 23 is formed of elastic material such as rubber and resin. In other words, the shock absorber 23 is attached to the bottom of the recess 13a around the associated end of the through hole 20a. The axial dimension of the cylindrical collar 21 is slightly smaller than the total of the axial dimension of the cylinder 20 and the axial dimension of the shock absorber 23.

Each valve stem 11 includes an inserting section 22 formed at the basal end of the valve stem 11. The diameter of the inserting section 22 is smaller than that of an axial intermediate section of the valve stem 11. A step 11a is formed between the axial intermediate section and the inserting section 22 of the valve stem 11. The outer diameter of the inserting section 22 is substantially equal to the inner diameter of the cylindrical collar 21. A threaded portion 22a is formed at the distal end of the inserting section 22.

When the inserting section 22 is passed through the cylindrical collar 21, a nut 24, which functions as a fastener, is engaged with the threaded portion 22a. When the nut 24 is fastened, the step 11a and the nut 24 clamp the cylinder 20 and the cylindrical collar 21, thus securing the valve stem 11 to the main body 10.

The axial dimension of the cylindrical collar 21 is slightly larger than the axial dimension of the cylinder 20. Thus, when the nut 24 is fastened, the step 11a and the nut 24 firmly clamp the cylindrical collar 21. Meanwhile, the distal end of the cylinder 20 abuts against the step 11a, and the shock absorber 23 elastically deforms. More specifically, when the shock absorber 23 deforms, the cylinder 20 is pressed against the step 11a. The nut 24 is received in the recess 13a of the casing 13 and is not exposed to the exterior of the recess 13a.

Although not illustrated, the signal-processing unit 17 is electrically connected to the associated valve stem 11. The signal-processing unit 17 wirelessly transmits data that indicate the condition of the associated tire 2 to the receiver 4 through the valve stem 11. That is, the valve stem 11 functions as a transmitting antenna.

A flange 11b projects integrally from an axial intermediate section of each valve stem 11. A threaded portion 11c is also formed along the axial intermediate section of the valve stem 11. A rubber grommet 26 is attached to the valve stem 11 to closely contact the associated side of the flange 11b.

Each wheel rim 5a has a through hole 6 through which the associated valve stem 11 is passed. More specifically, the valve stem 11 is passed through the through hole 6 from the inner side of the wheel rim 5a to project from the outer side of the wheel rim 5a. In this state, a nut 27 is engaged with the threaded portion 11c from the outer side of the wheel rim 5a. The nut 27 is fastened to secure the valve stem 11 to the wheel rim 5a. A rubber packing 28 and a metal washer 29 are located between the wheel rim 5a and the nut 27.

Each valve stem 11 has an axial, air inlet hole 11d. A valve core 30 is fitted in an end of the air inlet hole lid near the distal end of the valve stem 11. The cap 12 is engaged with a threaded portion lie formed along the distal end of the valve seat 11.

This embodiment has the following advantages.

The cylindrical collar 21, which is formed of metal, is fitted in the cylinder 20 of the casing 13. The valve stem 11 is passed through the collar 21 and is secured to the main body 10 by the nut 24. The fastening force of the nut 24 is applied mainly to the cylindrical collar 21 and barely affects the cylinder 20. Further, the cylinder 20 is pressed against the step 11a through the shock absorber 23, which elastically deforms, and is not affected directly by the fastening force of the nut 24. Thus, when the valve stem 11 is secured to the main body 10, the force that acts on the resin casing 13 does not become excessively great. This structure prevents the casing 13 from being damaged due to the fastening force of the nut 24. The shock absorber 23, which elastically deforms, prevents the valve stem 11 from becoming axially loose with respect to the casing 13.

Accordingly, the fastening torque of the nut 24 can be maximized and optimized, thus reliably securing the valve stem 11 to the main body 10 in a stable manner.

As compared to a resin cylindrical collar, the cylindrical collar 21, which is formed of metal, reduces creeping of the casing 13 due to the fastening force of the nut 24. This prevents the nut 24 from becoming loose, and the nut 24 is maintained in a stably fastened state for a prolonged time. Further, the shock absorber 23 absorbs vibration caused by movement of the vehicle 1. This also prevents the nut 24 from becoming loose.

The present invention may be embodied as the following modifications.

The cylindrical collar 21 does not necessarily have to be formed of metal but may be formed of, for example, resin. That is, the collar 21 may be formed of any material as long as the material is highly rigid and highly strong, as compared to the material of the casing 13.

The cross-sectional shape of the cylinder 20, the cylindrical collar 21, and the inserting section 22 is not restricted to the circular shape but may be, for example, a polygonal shape. Alternatively, the cross-sectional shape of the through hole 14a of the lid 14 and the cross-sectional shape of the portion of the valve stem 11 that corresponds to the through hole 14a may have shapes other than the circular shapes. This structure prevents the valve stem 11 from pivoting with respect to the main body 10.

The shock absorber 23 may be located between the distal end of the cylinder 20 and the step 11a. This structure also ensures the same operations and advantages as those of the embodiment illustrated in FIGS. 1 to 3.

The shock absorber 23 may be omitted. If this is the case, the axial dimension of the collar 21 need be substantially equal to or slightly larger than the axial dimension of the cylinder 20. This structure also prevents the fastening force of the nut 24 that acts on the cylinder 20 from becoming excessively great.

Figure 4:
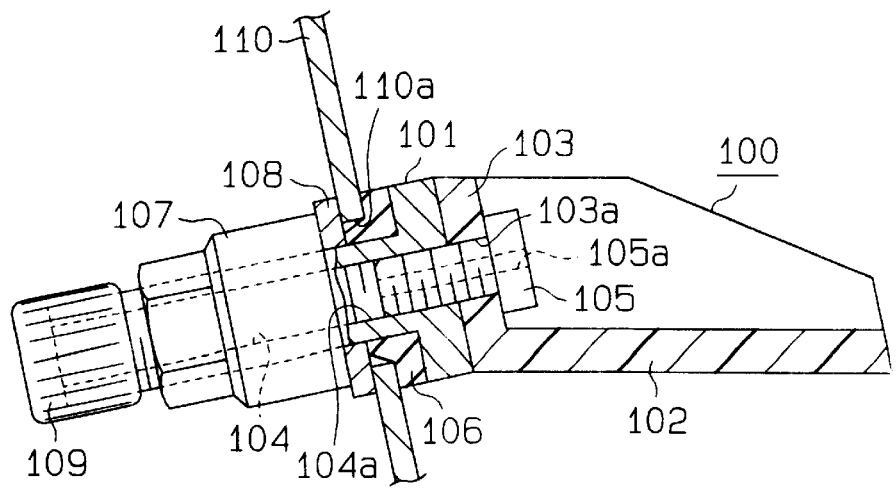
FIG. 4 is a cross-sectional view showing a transmitter of a prior art tire condition monitoring apparatus.

The present invention is not restricted to the application to the transmitter 3, which is shown in FIG. 3. The present invention may be applied to, for example, the prior art transmitter of FIG. 4. If this is the case, the collar 21 is passed through the bolt hole 103a of the attachment wall 103. Further, the bolt 105 functions as a fastener.

The tire condition monitoring apparatus of the present invention must measure and transmit at least the pressure in each tire 2. That is, the apparatus does not necessarily have to measure the temperature in the tire 2. If the apparatus measures and transmits only the pressure in the tires 2, the transmitters 3 need to have only a minimum but sufficient function. This reduces the manufacturing cost.

The present invention is not restricted to the application to four-wheel vehicles but may be applied to any vehicle, including two-wheel vehicles, as long as the vehicle has one or more wheels.

Therefore, the present examples and embodiments are to be considered as illustrative and not restrictive and the invention is not to be limited to the details given herein, but may be modified within the scope and equivalence of the appended claims.

What is claimed is:

1. A transmitter used in a tire condition monitoring apparatus for wirelessly transmitting data indicating a condition of a tire attached to a wheel of a vehicle, comprising:
   a main body, which is located in the tire and has an attachment portion through which an attachment hole extends;
   a cylindrical collar, which is received in the attachment hole, wherein the strength of the collar is larger than the strength of the main body;
   a valve stem, which projects from the main body to pass through the wheel; and
   a fastener, which is fastened to the valve stem to attach the valve stem to the attachment portion of the main body, wherein the attachment portion and the collar are clamped between the valve stem and the fastener when the fastener is fastened, and the fastening force of the fastener is applied mainly to the collar.

2. The transmitter as set forth in claim 1, wherein the main body is formed of resin and the collar is formed of metal.

3. The transmitter as set forth in claim 1, wherein the axial dimension of the collar is equal to or larger than the axial dimension of the attachment hole.

4. The transmitter as set forth in claim 1, wherein an elastic shock absorber is located between the attachment portion and the fastener.

5. The transmitter as set forth in claim 1, wherein the valve stem is formed of conductive material.

6. The transmitter as set forth in claim 5, wherein the valve stem functions as a transmitting antenna for wirelessly transmitting data.

7. The transmitter as set forth in claim 1, wherein the valve stem is formed of metal.

8. A transmitter used in a tire condition monitoring apparatus for wirelessly transmitting data indicating a condition of a tire attached to a wheel of a vehicle, comprising:
   a main body, which is located in the tire and has a cylinder through which a through hole extends;
   a cylindrical collar, which is received in the through hole, wherein the strength of the collar is larger than the strength of the main body;
   a valve stem, which projects from the main body to pass through the wheel, wherein an inserting section is formed at an end of the valve stem and is inserted in the collar, and a step is formed between the inserting section and the remainder of the valve stem; and
   a nut, which is fastened to the inserting section to attach the valve stem to the cylinder, wherein the cylinder and the collar are clamped between the step and the nut when the nut is fastened, and the fastening force of the nut is applied mainly to the collar.

9. The transmitter as set forth in claim 8, wherein the main body is formed of resin and the collar is formed of metal.

10. The transmitter as set forth in claim 8, wherein the axial dimension of the collar is larger than the axial dimension of the cylinder.

11. The transmitter as set forth in claim 8, wherein an elastic, annular shock absorber is located between the cylinder and the nut.

12. The transmitter as set forth in claim 11, wherein the axial dimension of the collar is larger than the axial dimension of the cylinder and is smaller than the total of the axial dimension of the cylinder and the axial dimension of the shock absorber.

13. The transmitter as set forth in claim 8, wherein the valve stem is formed of conductive material.

14. The transmitter as set forth in claim 13, wherein the valve stem functions as a transmitting antenna for wirelessly transmitting data.

15. The transmitter as set forth in claim 8, wherein the valve stem is formed of metal.

16. A transmitter used in a tire condition monitoring apparatus for wirelessly transmitting data indicating a condition of a tire attached to a wheel of a vehicle, comprising:
   a main body, which is located in the tire and has a resin casing, wherein the casing has a cylinder through which a through hole extends;
   a metal cylindrical collar, which is received in the through hole, wherein the axial dimension of the collar is larger than the axial dimension of the cylinder;
   a valve stem, which projects from the main body to pass through the wheel, wherein an inserting section is formed at an end of the valve stem and is inserted in the collar, and a step is formed between the inserting section and the remainder of the valve stem;
   a nut, which is fastened to the inserting section to attach the valve stem to the cylinder, wherein the cylinder and the collar are clamped between the step and the nut when the nut is fastened, and the fastening force of the nut is applied mainly to the collar; and
   an elastic, annular shock absorber, which is located between the cylinder and the nut, wherein the axial dimension of the collar is smaller than the total of the axial dimension of the cylinder and the axial dimension of the shock absorber, and the shock absorber elastically deforms to press the cylinder to the step when the nut is fastened.

17. The transmitter as set forth in claim 16, wherein the valve stern is formed of conductive material.

18. The transmitter as set forth in claim 17, wherein the valve stem functions as a transmitting antenna for wirelessly transmitting data.

19. The transmitter as set forth in claim 16, wherein the valve stem is formed of metal.

* * * * *